US012506273B2

(12) United States Patent
Wang et al.

(10) Patent No.: US 12,506,273 B2
(45) Date of Patent: Dec. 23, 2025

(54) PHASE MODULATION SURFACE UNIT, PHASE MODULATION SURFACE STRUCTURE, AND TERMINAL DEVICE

(71) Applicants: Beijing BOE Technology Development Co., Ltd., Beijing (CN); BOE Technology Group Co., Ltd., Beijing (CN)

(72) Inventors: Feng Wang, Beijing (CN); Long Wang, Beijing (CN); Yidan Peng, Beijing (CN); Feng Qu, Beijing (CN); Biqi Li, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 90 days.

(21) Appl. No.: 18/693,671

(22) PCT Filed: Aug. 23, 2022

(86) PCT No.: PCT/CN2022/114339
§ 371 (c)(1),
(2) Date: Mar. 20, 2024

(87) PCT Pub. No.: WO2024/040445
PCT Pub. Date: Feb. 29, 2024

(65) Prior Publication Data
US 2024/0396499 A1 Nov. 28, 2024

(51) Int. Cl.
*H01Q 15/00* (2006.01)
*H01Q 15/14* (2006.01)

(52) U.S. Cl.
CPC ..... *H01Q 15/0066* (2013.01); *H01Q 15/0013* (2013.01); *H01Q 15/148* (2013.01)

(58) Field of Classification Search
CPC ........... H01Q 15/0013; H01Q 15/0066; H01Q 15/148
See application file for complete search history.

(56) References Cited

U.S. PATENT DOCUMENTS

2023/0155265 A1* 5/2023 Guo .......................... H01P 1/18 343/702
2024/0297426 A1* 9/2024 Cui .......................... H01P 1/184
2025/0046974 A1* 2/2025 Zhang ..................... H01P 1/184

FOREIGN PATENT DOCUMENTS

CN 101464600 A 6/2009
CN 203054404 U 7/2013
(Continued)

*Primary Examiner* — Daniel Munoz
(74) *Attorney, Agent, or Firm* — Workman Nydegger

(57) ABSTRACT

Disclosed are a phase modulation surface unit, a phase modulation surface structure, and a terminal device. The phase modulation surface unit includes at least two phase-shifting layers which are stacked, where the phase-shifting layers each include: a first substrate; a second substrate; the first phase-shifting surface layer including at least one first electrode pattern extending in a first direction; the second phase-shifting surface layer including at least one second electrode pattern extending in a second direction and has one-to-one correspondence to the first electrode pattern, and the orthographic projection of the second electrode pattern on the first substrate intersecting with that of the corresponding first electrode pattern on the first substrate; and an tunable dielectric layer between the first phase-shifting surface layer and the second phase-shifting surface layer.

20 Claims, 12 Drawing Sheets

(56) References Cited

FOREIGN PATENT DOCUMENTS

| | | | |
|---|---|---|---|
| CN | 104330930 | A | 2/2015 |
| CN | 206210991 | U | 5/2017 |
| CN | 106980203 | A | 7/2017 |
| CN | 209248207 | U | 8/2019 |
| CN | 110609422 | A | 12/2019 |

* cited by examiner

PHASE MODULATION SURFACE UNIT, PHASE MODULATION SURFACE STRUCTURE, AND TERMINAL DEVICE

CROSS-REFERENCE TO RELATED APPLICATIONS

The application is a National Stage of International Application No. PCT/CN2022/114339, filed Aug. 23, 2022.

TECHNICAL FIELD

The present disclosure relates to the technical field of antenna communication equipment, and particularly relates to a phase modulation surface unit, a phase modulation surface structure and a terminal device.

BACKGROUND

A smart metasurface including a subwavelength resonator is an artificial composite metamaterial having programmable amplitude or phase modulation properties, and can operate in a reflection mode or in a transmission mode. In the transmission mode, it is considered a spatially phase modulation surface. In the reflection mode, it is also known as a smart reflective surface. The biggest market value of smart metasurface is that it can realize the active control for the wireless propagation environment in the wireless communication process, the dynamic regulation for the transmission direction of the electromagnetic signal in the three-dimensional space, and manipulation for the transmission channel between the transmitter and the receiver.

The most commonly used control method for the current smart metasurface is to embed PIN diodes in the array subunits of the smart metasurface, and drive the on/off of each PIN diode by electrical signals to achieve digital phase or amplitude modulation. In addition, researchers have also tried to control devices by using electrical signals of varactor diodes or MEMS (micro-electro-mechanical system) switches, etc., so as to realize the dynamic modulation for the compensated phase of the array subunits of the smart metasurface. However, there are some shortcomings in the above control methods. Firstly, for the tuning based on the PIN diodes and the MEMS switches, continuous phase or amplitude modulation cannot be performed, and more sub-units with different geometrical parameters are required in order to increase the digitized phase or amplitude modulation accuracy, which leads to a huge number of units and a multiplicative increase in the number of diodes required, and increases the difficulty of wiring in the driver circuit. Secondly, the phase variation range of the phase modulation metasurface is limited. At present, since many of the phase modulation metasurface structures are based on the resonance effect of the subunits for phase hopping, the range of the resonant phase of the single-layer oscillator is less than 180 degrees. Thirdly, for electric control methods such as varactor diodes that change the resonant frequency of the array subunits of smart metasurfaces, although continuous phase compensation can be achieved for each array subunit, specialized DAC (digital-to-analog) devices need to be embedded, and thus, the cost of achieving continuous and precise control for all subunits is high.

SUMMARY

The present disclosure provides a phase modulation surface unit, a phase modulation surface structure and a terminal device, and the above phase modulation surface unit is capable of realizing continuous and precisely controlled phase modulation, having a large phase modulation range as well as being capable of saving fabrication costs.

In order to achieve the above purpose, the present disclosure provides the following technical solution.

A phase modulation surface unit, including at least two phase-shifting layers that are stacked, where each phase-shifting layer includes:

a first substrate;

a second substrate opposite to the first substrate;

a first phase-shifting surface layer on a side of the first substrate facing the second substrate, where the first phase-shifting surface layer includes at least one first electrode pattern extending in a first direction and a first control line connected with the first electrode pattern;

a second phase-shifting surface layer on a side of the second substrate facing the first substrate, where the second phase-shifting surface layer includes at least one second electrode pattern extending in a second direction and corresponding one-to-one with the at least one first electrode pattern and a second control line connected with the second electrode pattern, an orthographic projection of the second electrode pattern on the first substrate intersects with an orthographic projection of the first electrode pattern, corresponding to the second electrode, on the first substrate, and the second electrode pattern and the first electrode pattern corresponding to the second electrode pattern forms one resonant unit; and a tunable dielectric layer, where the tunable dielectric layer is between the first phase-shifting surface layer and the second phase-shifting surface layer.

In some embodiments, in one resonant unit, the orthographic projection of the first electrode pattern on the first substrate and the orthographic projection of the second electrode pattern on the first substrate are mutually orthogonal.

In some embodiments, a length of the first electrode pattern is the same as a length of the second electrode pattern, a width of the first electrode pattern is the same as a width of the second electrode pattern, and a thickness of the first electrode pattern is the same as a thickness of the second electrode pattern.

In some embodiments, a center point of the orthographic projection of the first electrode pattern on the first substrate coincides with a center point of the orthographic projection of the second electrode pattern on the first substrate.

In some embodiments, in a middle region of the first electrode pattern, the first electrode pattern has a first strip-shaped groove extending in the first direction; and in a middle region of the second electrode pattern, the second electrode pattern has a second strip-shaped groove extending in the second direction, and an orthographic projection of the second strip-shaped groove on the first substrate intersects with an orthographic projection of the first strip-shaped groove on the first substrate.

In some embodiments, a length of the first strip-shaped groove is the same as a length of the second strip-shaped groove, and a width of the first strip-shaped groove is the same as a width of the second strip-shaped groove.

In some embodiments, the first electrode pattern has two first comb teeth extending in the second direction on each of two sides of the first electrode pattern arranged in the second direction, and a distance between the two first comb teeth is equal to the width of the second strip-shaped groove along the first direction;

the second electrode pattern has two second comb teeth extending in the first direction on each of two sides of the second electrode pattern arranged in the first direction, and a distance between the two second comb teeth is equal to the width of the first strip-shaped groove along the second direction; and the orthographic projection of the second electrode pattern on the first substrate covers an orthographic projection of the first comb teeth on the first substrate, and the orthographic projection of the first electrode pattern on the first substrate covers an orthographic projection of the second comb teeth on the first substrate.

In some embodiments, a length of the first comb teeth along the second direction is the same as a length of the second comb teeth along the first direction, and a width of the first comb teeth along the first direction is the same as a width of the second comb teeth along the second direction.

In some embodiments, the width of the first comb teeth along the first direction is the same as a width between an inner wall of the second electrode pattern and an outer wall of the second electrode pattern along the second direction, and the width of the second comb teeth along the second direction is the same as a width between an inner wall of the first electrode pattern and an outer wall of the first electrode pattern along the first direction.

In some embodiments, the first phase-shifting surface layer includes a plurality of first electrode patterns distributed in an array, and the second phase-shifting surface layer includes a plurality of second electrode patterns corresponding one-to-one with the plurality of first electrode patterns to form a plurality of the resonant units, a row direction of the plurality of resonant units arrangement is the first direction, and a column direction of the plurality of resonant units arrangement is the second direction;

the plurality of the resonant units along the first direction and/or the second direction have different resonant frequencies.

In some embodiments, along the first direction and/or the second direction, lengths of the first strip-shaped grooves in different resonant units are different and lengths of the second strip-shaped grooves in different resonant units are different, or, lengths of the first comb teeth in different the resonant units are different and lengths of the second comb teeth in different the resonant units are different.

In some embodiments, the first phase-shifting surface layer includes four first electrode patterns distributed in a 2×2 array, and the second phase-shifting surface layer includes second electrode patterns corresponding one-to-one with the four first electrode patterns.

In some embodiments, at least along the first direction, a length of the first strip-shaped groove and a length of the second strip-shaped groove in one of two adjacent resonant units are a first length, and a length of the first strip-shaped groove and a length of the second strip-shaped groove in the other of the two adjacent resonant units are a second length, and the first length is greater than the second length.

In some embodiments, along the first direction and the second direction, a length of the first strip-shaped groove and a length of the second strip-shaped groove in one of two adjacent resonant units are a first length, and a length of the first strip-shaped groove and a length of the second strip-shaped groove in the other of the two adjacent resonant units are a second length, and the first length is greater than the second length.

In some embodiments, at least along the first direction, a length of the first comb tooth and a length of the second comb tooth in one of two adjacent resonant units are a third length, and a length of the first comb tooth and a length of the second comb tooth in the other of the two adjacent resonant units are a fourth length, and the fourth length is greater than the third length.

In some embodiments, along the first direction and the second direction, a length of the first comb tooth and a length of the second comb tooth in one of two adjacent resonant units are a third length, and a length of the first comb tooth and a length of the second comb tooth in the other of the two adjacent resonant units are a fourth length, and the fourth length is greater than the third length.

In some embodiments, along the first direction, first electrode patterns in two adjacent resonant units are connected with each other;

along the second direction, second electrode patterns in two adjacent resonant units that are adjacent to each other are connected with each other.

In some embodiments, the first electrode pattern includes two straight line portions extending along the first direction and a microstrip line portion connected between the two straight line portions;

where the orthographic projection of the second electrode pattern on the first substrate covers an orthographic projection of the microstrip line portion on the first substrate.

In some embodiments, the microstrip line portion is in a form of a folded line.

In some embodiments, the microstrip line portion includes at least two square-wave shaped folded line portions arranged in intervals along the first direction.

In some embodiments, the first substrate and the second substrate that are adjacent to each other and are respectively in the two stacked phase-shifting layers that are adjacent to each other are one substrate.

In some embodiments, the at least two phase-shifting layers have the same structure, orthographic projections of first electrode patterns in different first phase-shifting surface layers on one first substrate completely overlap with each other, and orthographic projections of second electrode patterns in different second phase-shifting surface layers on one first substrate completely overlap with each other.

In some embodiments, the tunable dielectric layer is a liquid crystal layer; and the phase modulation surface unit further includes a first alignment layer and a second alignment layer, the first alignment layer is on a side of the first phase-shifting surface layer facing the tunable dielectric layer, and the second alignment layer is on a side of the second phase-shifting surface layer facing the tunable dielectric layer.

The present disclosure also provides a phase modulation surface structure, including at least one phase modulation surface unit arranged in array provided by any one of the above technical solutions.

The present disclosure also provides a terminal device, including the phase modulation surface structure provided by the above technical solution and a control board for controlling a voltage applied to the first electrode pattern and the second electrode pattern.

Embodiments of the present disclosure provide the phase modulation surface unit, the phase modulation surface structure, and the terminal device. The phase modulation surface structure includes at least two phase-shifting layers that are stacked, and the phase-shifting layer includes the first substrate, the second substrate, the first phase-shifting surface layer, the second phase-shifting surface layer, and the tunable dielectric layer. The orthographic projection of the first electrode pattern in the first phase-shifting surface layer on the first substrate intersects with the orthographic projection of the second electrode pattern in the second phase-shifting surface layer on the first substrate. The first electrode pattern and the second electrode pattern are capable of being constructed one resonant unit which is capable of resonating in a specific single frequency band. Since the tunable dielectric layer is provided between the first phase-shifting surface layer and the second phase-shifting surface layer, the tunable dielectric layer can be used as a tuned filter. The first electrode pattern and the second electrode pattern can be controlled via the first control line and the second control line, respectively, to apply a voltage to the tunable dielectric layer to adjust the resonant frequency of the resonant unit. The single phase-shifting layer is capable of generating a phase-shiftable range of less than 180° for a signal in the specific single frequency band, while the at least two such phase-shifting layers that are stacked can form resonant structures in at least two layers, which, as shown in FIG. 3, is capable of generating a phase-shiftable range of 0° to 180° or a larger phase-shiftable range, and the resonant structures in at least two-layers are capable of flatten in-band transmittance or reflectance, which can achieve relatively constant transmittance or reflectance over a wider frequency band range. In the above phase modulation surface unit, continuous and precisely controlled phase modulation can be realized by applying different voltages to the tunable dielectric layer, and the at least two phase-shifting layers that are stacked can generate a larger phase-shifting range, while there is no need to control each resonant unit to change the resonant frequency by means of a varactor diode or the like and there is no need to additionally add other electronic devices, and it is only necessary to apply voltages to the first electrode pattern and the second electrode pattern through the first control line and the second control line to realize the adjustment of the resonant frequency, so the fabrication process as well as the structure are simple, and the fabrication cost can be saved.

ICONS

100—phase-shifting layer; 101—resonant unit; 1—first substrate; 2—second substrate; 3—first phase-shifting surface layer; 31—first electrode pattern; 311—first strip-shaped groove; 312—first comb tooth; 313—straight line portion; 314—microstrip line portion; 4—second phase-shifting surface layer; 41—second electrode pattern; 411—second strip-shaped groove; 5—tunable dielectric layer; 6—first alignment layer; 7—second alignment layer.

DETAILED DESCRIPTION

The technical solutions in embodiments of the present disclosure will be clearly and completely described below in conjunction with the accompanying drawings in embodiments of the present disclosure, and obviously, the described embodiments are only a part of embodiments of the present disclosure and not all of embodiments. Based on embodiments in the present disclosure, all other embodiments obtained by a person of ordinary skill in the art without making creative labor fall within the scope of protection of the present disclosure.

Figure 1:
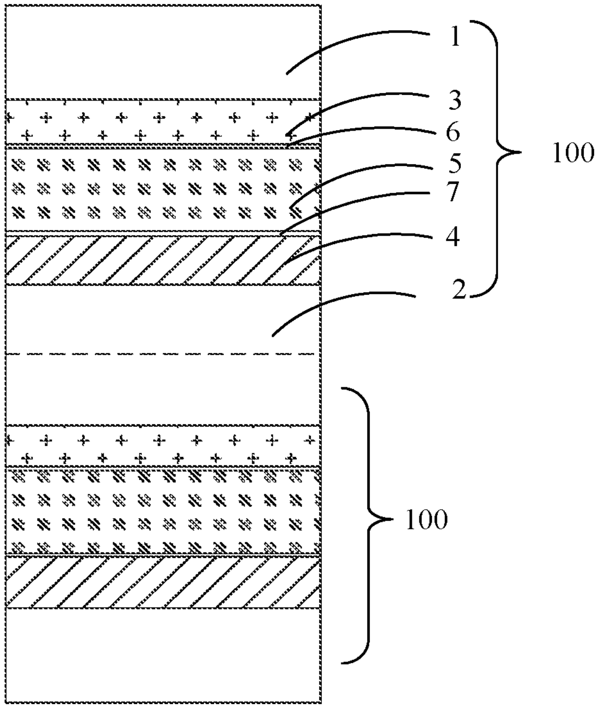
FIG. 1 shows a schematic structural diagram of a phase modulation surface unit provided by embodiments of the present disclosure.
Figure 2:
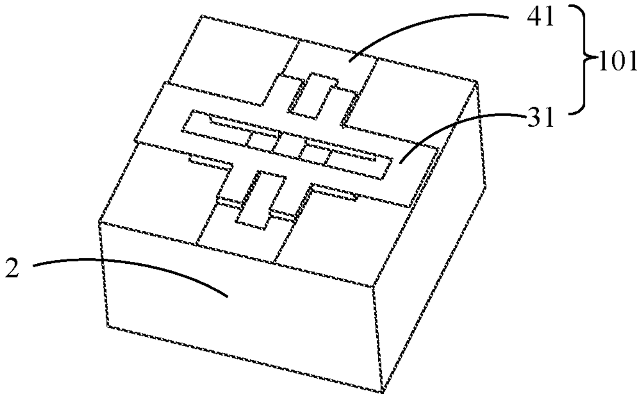
FIG. 2 shows a three-dimensional schematic diagram of a resonant unit provided by embodiments of the present disclosure.
Figure 3:
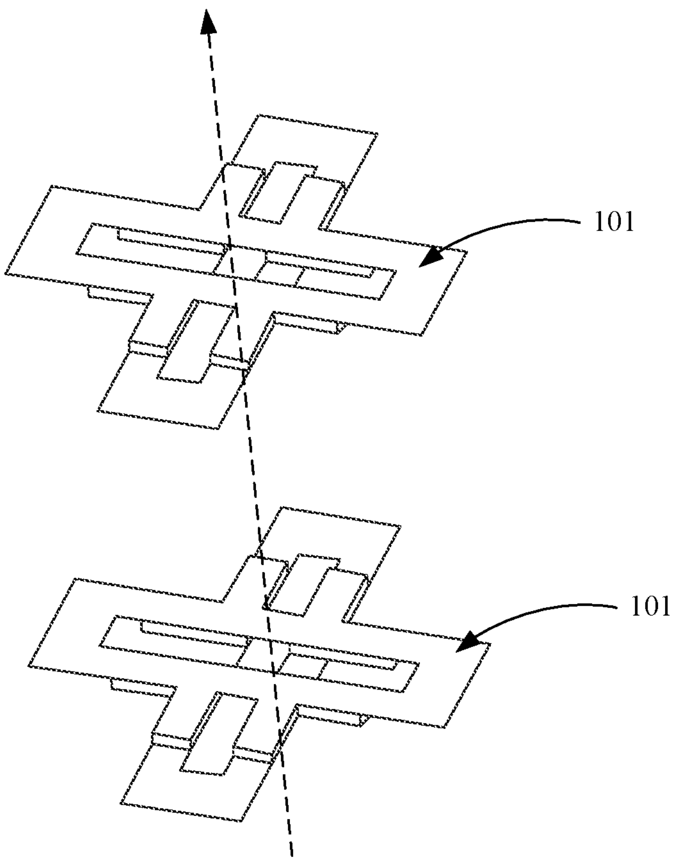
FIG. 3 shows a schematic structural diagram of a two-layer resonant unit provided by embodiments of the present disclosure.

Referring to FIG. 1, FIG. 2, and FIG. 3, the present disclosure provides a phase modulation surface unit including at least two phase-shifting layers 100 that are stacked, where each phase-shifting layer 100 includes:

- a first substrate 1;
- a second substrate 2 opposite the first substrate 1;
- a first phase-shifting surface layer 3 on a side of the first substrate 1 facing the second substrate 2, where the first phase-shifting surface layer 3 includes at least one first electrode pattern 31 extending in a first direction x and a first control line connected with the first electrode pattern 31;
- a second phase-shifting surface layer 4 on a side of the second substrate 2 facing the first substrate 1, where the second phase-shifting surface layer 4 includes at least one second electrode pattern 41 extending in a second direction y and corresponding one-to-one with the at least one first electrode pattern 31 and a second control line connected with the second electrode pattern, an orthographic projection of the second electrode pattern 41 on the first substrate 1 intersects with an orthographic projection of the first electrode pattern 31, corresponding to the second electrode, on the first substrate 1, and the second electrode pattern and the first electrode pattern 31 corresponding to the second electrode pattern forms one resonant unit 101;
- a tunable dielectric layer 5, where the tunable dielectric layer 5 between the first phase-shifting surface layer 3 and the second phase-shifting surface layer 4.

The phase modulation surface unit provided by embodiments of the present disclosure includes at least two phase-shifting layers 100 that are stacked, and the phase-shifting layer 100 includes the first substrate 1, the second substrate 2, the first phase-shifting surface layer 3, the second phase-shifting surface layer 4, and the tunable dielectric layer 5. The orthographic projection of the first electrode pattern 31 in the first phase-shifting surface layer 3 on the first substrate intersects with the orthographic projection of the second electrode pattern 41 in the second phase-shifting surface layer 4 on the first substrate. The first electrode pattern 31 and the second electrode pattern 41 are capable of being constructed one resonant unit 101 which is capable of resonating in a specific single frequency band. Since the tunable dielectric layer 5 is provided between the first phase-shifting surface layer 3 and the second phase-shifting surface layer 4, the tunable dielectric layer 5 can be used as a tuned filter. The first electrode pattern 31 and the second electrode pattern 41 can be controlled via the first control line and the second control line, respectively, to apply a voltage to the tunable dielectric layer 5 to adjust the resonant frequency of the resonant unit 101. The single phase-shifting layer 100 is capable of generating a phase-shiftable range of less than 180° for a signal in the specific single frequency band, while the at least two such phase-shifting layers 100 that are stacked can form resonant structures in at least two layers, which, as shown in FIG. 3, is capable of generating a phase-shiftable range of 0° to 180° or a larger phase-shiftable range, and the resonant structures in at least two-layers are capable of flatten in-band transmittance or reflectance, which can achieve relatively constant transmittance or reflectance over a wider frequency band range. In the above phase modulation surface unit, continuous and precisely controlled phase modulation can be realized by applying different voltages to the tunable dielectric layer 5, and the at least two phase-shifting layers 100 that are stacked can generate a larger phase-shifting range, while there is no need to control each resonant unit 101 to change the resonant frequency by means of a varactor diode or the like and there is no need to additionally add other electronic devices, and it is only necessary to apply voltages to the first electrode pattern 31 and the second electrode pattern 41 through the first control line and the second control line to realize the adjustment of the resonant frequency, so the fabrication process as well as the structure are simple, and the fabrication cost can be saved.

In some embodiments, the first electrode pattern 31 and the first control line can be fabricated in the same layer, and the second electrode pattern 41 and the second control line can be fabricated in the same layer, which can simplify the fabrication process and save costs. The first electrode pattern 31 can be grounded and the second electrode pattern 41 can be connected with a high voltage or a low voltage to control the adjustment of the resonant frequency in the tunable dielectric layer 5.

In some embodiments, as shown in FIG. 1, in the above phase-shifting layer 100, the tunable dielectric layer 5 may be a liquid crystal layer, and in the above phase modulation surface unit, different deflection voltages may be applied to the liquid crystal layer by means of the first electrode pattern and the second electrode pattern to enable continuous and precisely controlled phase modulation by means of different deflection angles of the liquid crystal molecules in the liquid crystal layer. The phase modulation surface unit further includes a first alignment layer 6 and a second alignment layer 7, where the first alignment layer 6 is on a side of the first phase-shifting surface layer 3 facing the tunable dielectric layer 5, and the second alignment layer 7 is on the side of the second phase-shifting surface layer 4 facing the tunable dielectric layer 5, the rotation angle of the liquid crystal molecules is preset as an initial angle when no voltage is applied to the liquid crystal molecules by means of the first alignment layer 6 and the second alignment layer 7, which facilitates adjustment of the resonant frequency of the resonant unit 101.

Figure 4:
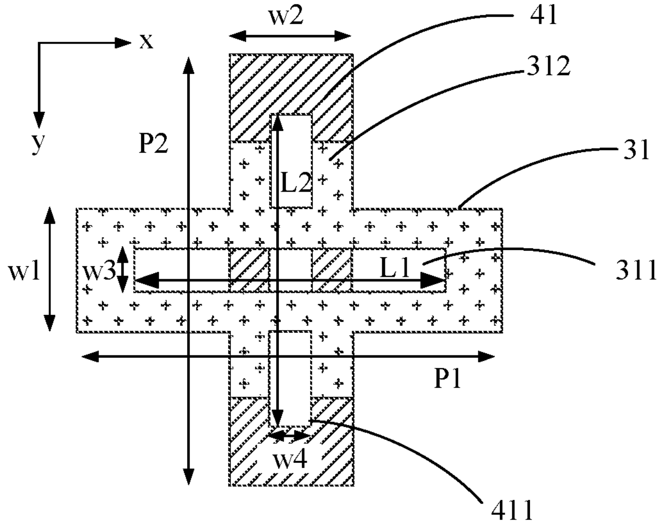
FIG. 4 is a schematic structural diagram of a resonant unit provided by embodiments of the present disclosure.

In the above phase-shifting layer 100, as shown in FIG. 4, in one resonant unit 101, the orthographic projection of the first electrode pattern 31 on the first substrate may be orthogonal to the orthographic projection of the second electrode pattern 41 on the first substrate, or the orthographic projection of the first electrode pattern 31 on the first substrate may be at a specific angle to the orthographic projection of the second electrode pattern 41 on the first substrate, which is not limited here and may be determined according to the actual situation.

In some embodiments, in one resonant unit 101, a length of the first electrode pattern 31 may be the same as a length of the second electrode pattern 41, a width of the first electrode pattern 31 may be the same as a width of the second electrode pattern 41, and a thickness of the first electrode pattern 31 may be the same as a thickness of the second electrode pattern 41. The specific size values of the first electrode pattern 31 and the second electrode pattern 41 are not limited herein, and may be determined according to the actual situation. The length of the first electrode pattern 31 is a period size P1 of the first electrode pattern 31, the length of the second electrode pattern 41 is a period size P2 of the second electrode pattern 41; the width of the first electrode pattern 31 is w1, and the width of the second electrode pattern 41 is w2; and the thickness of the first electrode pattern 31 and the thickness of the second electrode pattern 41 are both h, which may be 20 mm. A thickness of the tunable dielectric layer 5 may be d, a distance between the first electrode pattern 31 and the second electrode pattern 41 is d−2h, d−2h may be 26 μm, and a thickness of the first alignment layer 6 and a thickness of the second alignment layer 7 may be 100 nm.

In some embodiments, in one resonant unit 101, a center point of an orthographic projection of the first electrode pattern 31 on the first substrate may coincide with a center point of an orthographic projection of the second electrode pattern 4 on the first substrate 1. That is, the orthographic projection of the first electrode pattern on the first substrate and the orthographic projection of the second electrode pattern on the first substrate intersect with each other at the center points of the two. In some embodiments, the orthographic projection of the first electrode pattern 31 on the first substrate and the orthographic projection of the second electrode pattern 41 on the first substrate may also not intersect at their respective center points, which is not limited herein and is determined according to the actual situation.

In the embodiment of the present disclosure, the first electrode pattern 31 and the second electrode pattern 41 may not be a simple one linear electrode, and certain deformation may be made in the region where the first electrode pattern 31 and the second electrode pattern 41 intersect and overlap with each other.

Figure 5:
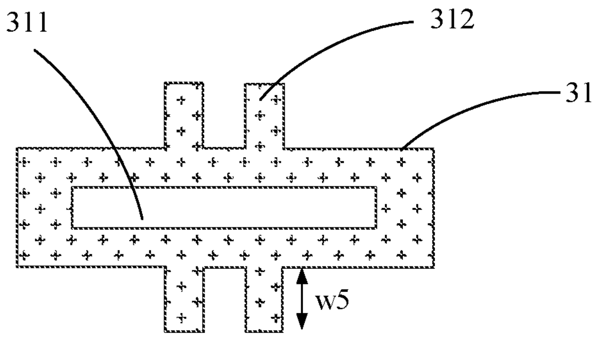
FIG. 5 shows a schematic structural diagram of a first electrode pattern provided by embodiments of the present disclosure.
Figure 6:
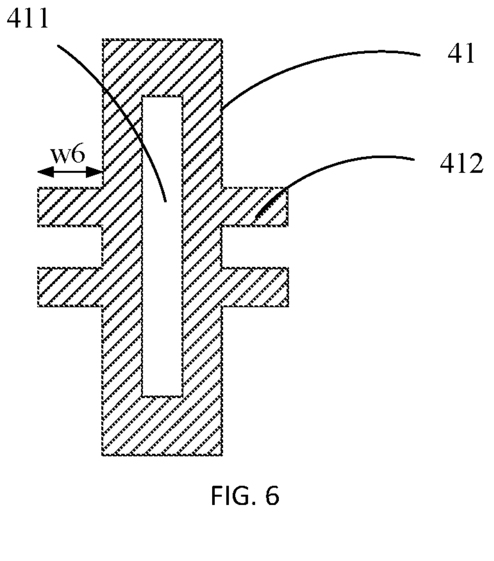
FIG. 6 shows a schematic structural diagram of a second electrode pattern provided by embodiments of the present disclosure.

In some embodiments, as shown in FIG. 5, in a middle region of the above first electrode pattern 31, the first electrode pattern may have a first strip-shaped groove 311 extending in the first direction x; and as shown in FIG. 6, in a middle region of the above second electrode pattern 41, the second electrode pattern may have a second strip-shaped groove 411 extending in the second direction y. An orthographic projection of the second strip-shaped groove 411 on the first substrate intersects with an orthographic projection of the first strip-shaped groove 311 on the first substrate, which can effectively compress the size of the resonant unit 101. By finely controlling each resonant unit 101, more complex and controllable phase modulation characteristics of the phase modulation array structure can be realized, and the beam deflection angle range can also be increased. In practice, the length of the first electrode pattern 31 and the length of the second electrode pattern 41 can be up to 1.6 mm, which is ⅙ to ⅐ of the wavelength of 28 GHz.

In the above first electrode pattern 31 and second electrode pattern 41, it may be provided that a length of the first strip-shaped groove 311 is the same as a length of the second strip-shaped groove 411, and a width of the first strip-shaped groove 311 is the same as a width of the second strip-shaped groove 411. In some embodiments, the length and the width of the first strip-shaped groove 311 may also be different from the length and the width of the second strip-shaped groove 411, which may be determined according to the actual situation, and will not be limited herein.

In some embodiments, the midpoint of the orthographic projection of the first strip-shaped groove 311 on the first substrate and the midpoint of the orthographic projection of the second strip-shaped groove 411 on the first substrate can overlap with each other, making the resonant unit symmetrical, which is conducive to improving the resonance effect of the resonant unit 101.

In the above structure of the first electrode pattern 31 and the second electrode pattern 41, as shown in FIG. 5, the first electrode pattern 31 may also have two first comb teeth 312 extending in the second direction y on each of two sides of the first electrode pattern arranged in the second direction y, and a distance between the two first comb teeth 312 is equal to the width of the second strip-shaped groove in the first direction x; and, as shown in FIG. 6, the second electrode pattern 41 may also have two second comb teeth extending in the first direction x on each of two sides of the second electrode pattern arranged in the first direction x, and a distance between the two second comb teeth is equal to the width of the first strip-shaped groove 311 along the second direction y. As shown in FIG. 4, the orthographic projection of the second electrode pattern 41 on the first substrate 1 covers an orthographic projection of the first comb teeth 312 on the first substrate 1, and the orthographic projection of the first electrode pattern 31 on the first substrate 1 covers an orthographic projection of the second comb teeth on the first substrate 1, which can increase an overlapping area where the first electrode pattern 31 overlaps with the second electrode pattern 41 in one resonant unit 101, and the larger overlapping area can help to reduce the size of the resonant unit 101 as well as to increase the frequency modulation range after applying a voltage on the tunable dielectric layer 5. In practice, the size of the above resonant unit 101 can be as small as ⅒ wavelength order of magnitude of the wavelength of 28 GHz, which can enable the deflection angle of the beam incident in a direction of which is perpendicular to the phase modulation surface within the range of ±50°.

A length w5 of the first comb teeth 312 along the second direction y can be the same as a length w6 of the second comb teeth along the first direction x, and a width of the first comb teeth 312 along the first direction x can be the same as a width of the second comb teeth along the second direction y, so as to ensure the resonance effect of the resonant unit 101.

In some embodiments, the width of the above first comb teeth 312 along the first direction x may be the same as a width between an inner wall and an outer wall of the second electrode pattern 41 along the second direction y, and the width of the second comb teeth along the second direction y may be the same as a width of the first direction x between an inner wall and an outer wall of the first electrode pattern 31 along the first direction x, which may increase an area where the first electrode pattern 31 and the second electrode pattern 41 overlap and opposite to each other, and which is conducive to reducing the size of the resonant unit 101.

In the embodiment of the present disclosure, as shown in FIG. 10, FIG. 13, FIG. 16, and FIG. 19, the above first phase-shifting surface layer 3 may include a plurality of first electrode patterns 31 distributed in an array, and the second phase-shifting surface layer 4 includes second electrode patterns 41 corresponding one-to-one with the plurality of first electrode patterns 31 to form a plurality of resonant units 101, a row direction of the plurality of resonant units 101 is the first direction x, and a column direction of the plurality of resonant units 101 is the second direction y. The resonant frequencies of the plurality of resonant units 101 along the first direction x and/or the second direction y are different. That is, one phase-shifting layer 100 of the above phase modulation surface unit may have the plurality of resonant units 101 distributed in an array, and the resonant frequencies of the plurality of resonant units 101 along the first direction x and/or the second direction y are different, which can further expand the phase modulation range generated by the phase modulation surface unit for the specific frequency band.

In some embodiments, along the first direction x and/or the second direction y, lengths of the first strip-shaped grooves 311 of the plurality of resonant units 101 are different and lengths of the second strip-shaped grooves 411 of the plurality of resonant units 101 are different, or lengths of the first comb teeth 312 of the plurality of resonant units 101 are different and lengths of the second comb teeth of the plurality of resonant units 101 are different. That is, the different resonant frequencies of the plurality of resonant units 101 can be realized by providing the strip-shaped grooves with different lengths or the comb teeth with different lengths. The length of the above first strip-shaped groove 311 is the length of the first strip-shaped groove 311 along the first direction x, the length of the above second strip-shaped groove 411 is the length of the second strip-shaped groove 411 along the second direction y, the length of the above first comb tooth 312 is the length of the first comb tooth 312 along the second direction y, and the length of the above second comb tooth is the length of the second comb tooth along the first direction x.

In some embodiments, the first phase-shifting surface layer 3 may include four first electrode patterns distributed in a 2×2 array, and the second phase-shifting surface layer may include second electrode patterns 41 corresponding one-to-one with the four first electrode patterns 31. That is to say, the phase-shifting layer 100 may include 4 resonant units 101 arranged in a 2×2 array, and in the first direction x and/or the second direction y, the resonant frequencies of the two resonant units 101 are different, which can realize a dual-resonant phase modulation structure for the two frequency bands within the phase-shifting layer 100. By setting each phase-shifting layer 100 as a dual-resonant structure, a phase-shiftable range of 360° or even greater than 360° may be generated for the signal in the specific single frequency band.

The above phase-shifting surface unit may have two phase-shifting layers 100 that are stacked, and each phase-shifting layer 100 is provided with the dual-resonant phase modulation structure. Assuming that the phase-shifting surface unit is in a transmission mode, and this setting manner is capable of converting a 180° phase jump of a transmission wave in a case of the single-layer resonant structure into a 360° phase jump, thereby realizing a phase adjustment amount of about 180°.

Figure 7:
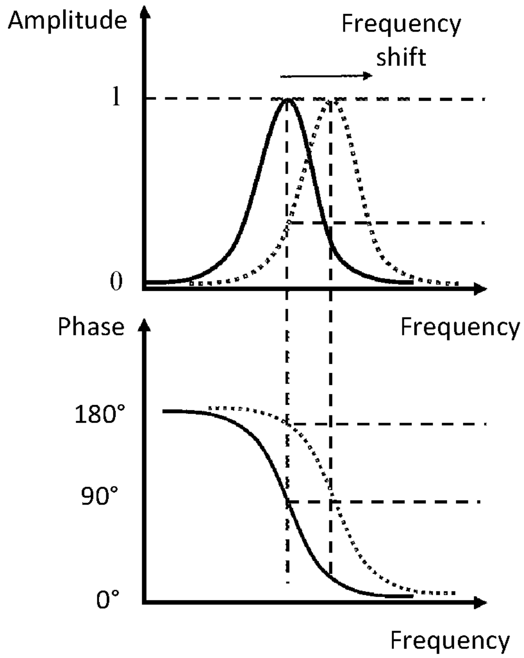
FIG. 7 shows a single-resonant phase modulation waveform diagram of a single phase-shifting layer provided by embodiments of the present disclosure.
Figure 8:
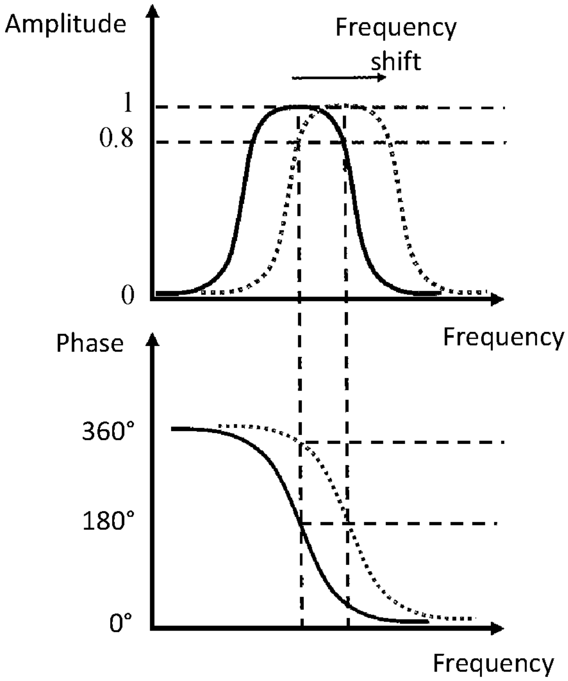
FIG. 8 shows a single-resonant phase modulation waveform diagram of two phase-shifting layers provided by embodiments of the present disclosure.
Figure 9:
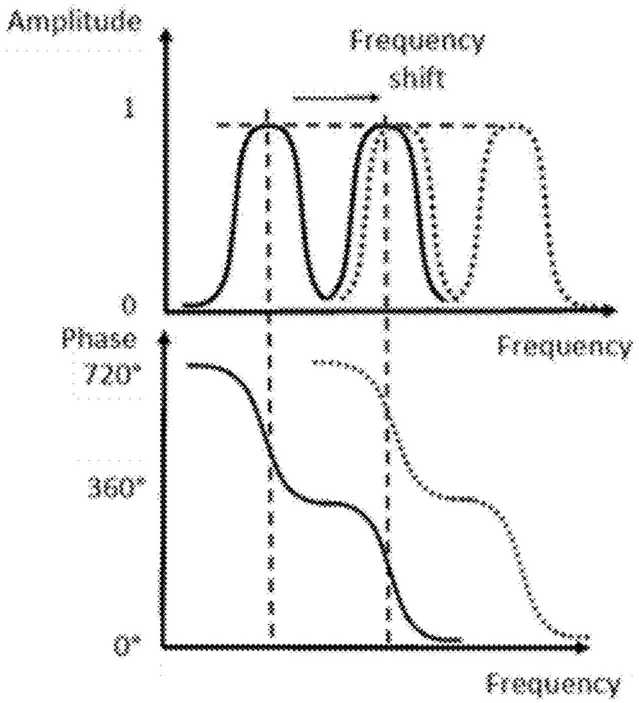
FIG. 9 shows a dual-resonant phase modulation waveform diagram of two phase shifted layers provided by embodiments of the present disclosure.

As shown in FIG. 7, FIG. 8, and FIG. 9, graphs of effects of phase-shifting for a specific frequency band under three different resonant structures are shown, respectively. The orientation states of liquid crystal molecules in the tunable dielectric layer 5 change consistently when the phase modulation is performed on the signal under the three different resonant structures. Solid line curves in FIG. 7, FIG. 8 and FIG. 9 are state diagrams of a frequency band through the phase modulation surface unit under a first orientation state of liquid crystal molecules. Dotted line curves in FIG. 7, FIG. 8 and FIG. 9 are state diagrams of a frequency band through the phase modulation surface unit under a second orientation state of liquid crystal molecules. FIG. 7 shows an effect diagram of signal phase-shifting in the case of a single phase-shifting layer 100 of a single-resonant structure, and a phase jump of 90° is generated by the transmittance peak after the phase modulation. FIG. 8 shows an effect diagram of frequency band phase-shifting in the case of two phase-shifting layers 100 of single-resonant structures, an a phase jump of 180° is generated by the transmittance peak after phase modulation. FIG. 9 shows an effect diagram of frequency band phase-shifting in the case of two phase-shifting layers 100 of dual-resonant phase modulation structures, and a phase jump of 360° is generated by the transmittance peak after phase modulation, which increases the phase adjustment amount. Moreover, the resonant structures of the two phase-shifting layers 100 can make the transmittance peaks relatively flatter, which are beneficial for maintaining a constant transmittance when applying phase modulation alone, thereby increasing the relative bandwidth. In some embodiments, by setting a suitable distance between the two phase-shifting layers 100, it is also favorable to make the transmittance peaks flatter, which can relatively increase the bandwidth.

In some embodiments, at least along the first direction x, a length of the first strip-shaped groove 311 and a length of the second strip-shaped groove 411 in one resonant unit 101 of two resonant units 101 that are adjacent to each other are a first length, and a length of the first strip-shaped groove 311 and a length of the second strip-shaped groove 411 in the other resonant unit 101 of the two resonant units are a second length, and the first length is greater than the second length, which can make that two resonant units 101 that are adjacent to each other in the first direction x have different resonant frequencies.

Figure 10:
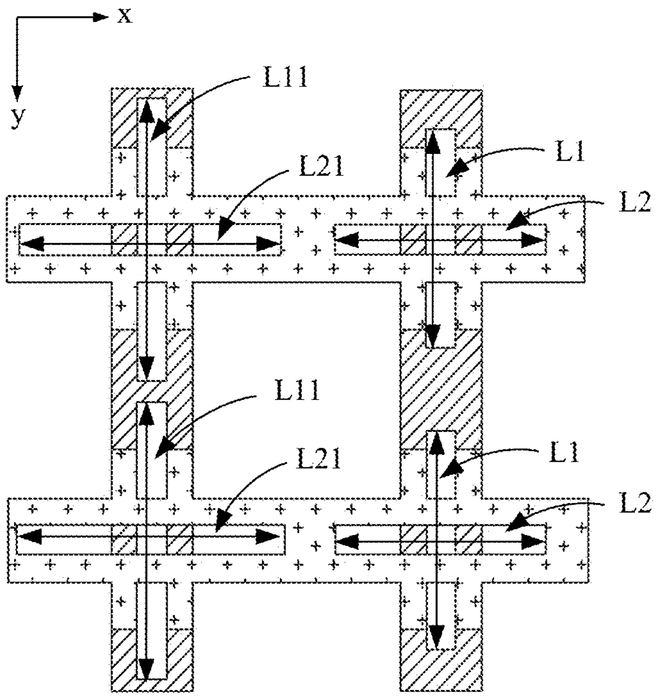
FIG. 10 shows a schematic structural diagram of an arrangement of resonant units in a phase-shifting layer provided by embodiments of the present disclosure.

For example, as shown in FIG. 10, one phase-shifting layer 100 includes four resonant units 101, and in the row direction, the length of the first strip-shaped groove 311 and the length of the second strip-shaped groove 411 in one of the two resonant units 101 are both greater than the length of the first strip-shaped groove 311 and the length of the second strip-shaped groove 411 in the other of the two resonant units 101. While in the column direction, in two different resonant units 101, lengths of the first strip-shaped groove 311 are equal to each other and lengths of the second strip-shaped groove 411 are equal to each other.

Figure 11:
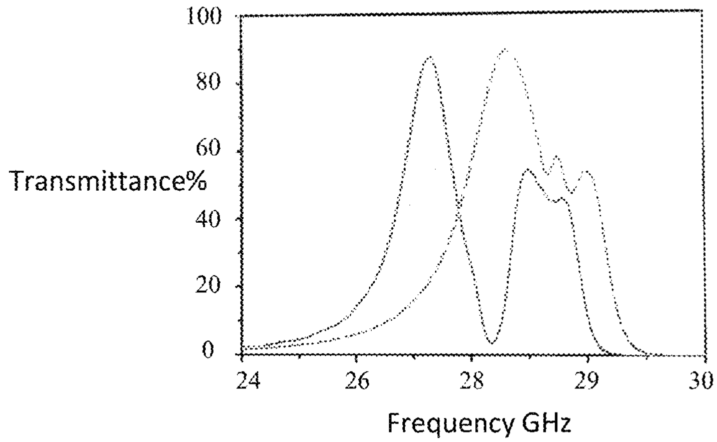
FIG. 11 shows a graph of a relationship between frequency and transmittance provided by embodiments of the present disclosure.
Figure 12:
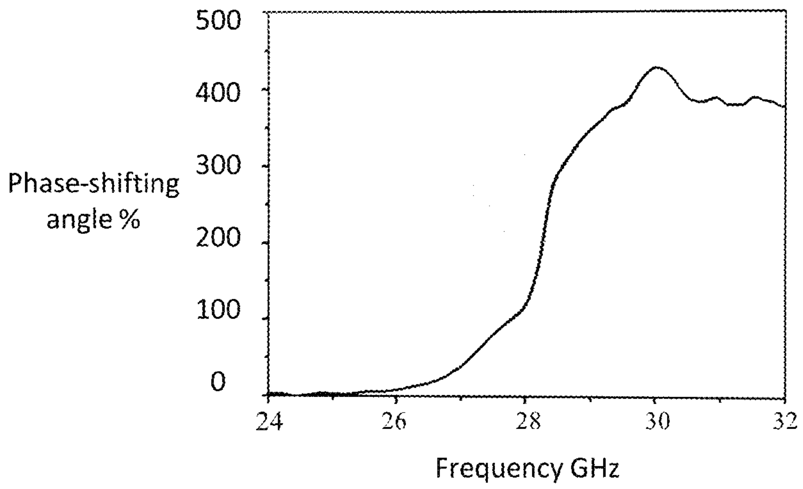
FIG. 12 shows a graph of a relationship between frequency and phase-shifting angle provided by embodiments of the present disclosure.

In practice, in each of the four resonant units 101 in FIG. 10, the orthographic projection of the first electrode pattern 31 on the first substrate and the orthographic projection of the second electrode pattern 41 on the first substrate are orthogonal to each other, and the intersection point of the two is the center point of the orthographic projections of the first electrode pattern 31 and the second electrode pattern 41 on the first substrate. In the four resonant units 101, the lengths P1 of the first electrode patterns 31 are equal to each other, the lengths P2 of the second electrode patterns 41 are equal to each other, the widths w1 of the first electrode patterns 31 are equal to each other, the widths w2 of the second electrode patterns 41 are equal to each other, the widths w3 of the first strip-shaped grooves 311 are equal to each other, the widths w4 of the second strip-shaped grooves 411 are equal to each other, the lengths w5 of the first comb teeth 312 are equal to each other, and the lengths w6 of the second comb teeth are equal to each other. It can be set that P1=P2=1.6 mm, w1=w2=0.56 mm, w3=w4=0.22 mm, and w5=w6=0.04 mm. In the row direction, the lengths L1 of the first strip-shaped grooves 311 in the two resonant units 101 are different from each other, and the lengths L2 of the second strip-shaped grooves 411 in the two resonant units 101 are different from each other. In one of the two resonant units 101, L1=L2=1.4 mm, and in the other of the two resonant units 101, the length L11 of the first strip-shaped groove 311 and the length L21 of the second strip-shaped groove may be L11=L21=1.44 mm. The thickness (d−2h) of the tunable dielectric layer 5 between the first electrode pattern 31 and the second electrode pattern 41 may be 20 micrometers, and the liquid crystal dielectric constants may be $\varepsilon_\parallel$=3.58 (tan δ=0.006), $\varepsilon_\perp$=2.45 (tan δ=0.011). The structure in FIG. 10 is used to perform phase modulation on space millimeter waves in the frequency band of 27 GHz with a vacuum wavelength of about 11.1 mm. When a high voltage is applied to both rows of resonant units 101, assuming that the liquid crystal molecules are oriented exactly perpendicular to the plane of the first electrode patterns 31 and the plane of the second electrode patterns 41, the transmittance peaks of the liquid crystal molecules can be shown as the solid line curve in FIG. 11. When a low voltage is applied to a row of resonant units 101 having longer strip-shaped grooves (L11=L21=1.44 mm) and a high voltage is applied to a row of resonant units 101 having shorter strip-shaped grooves (L1=L2=1.4 mm), the transmittance curve may be as shown by the dotted line curve in FIG. 11. With such an electrode line driving manner, the bandwidth is wider. As shown in FIG. 11, the width of the second transmittance peak of the solid line curve is much smaller than the width of the second transmittance peak of the dotted line curve. This allows for a larger phase adjustment within a wider bandwidth, and the transmittance peaks originally at 26.5 GHZ and 28.3 GHz are shifted to 28.8 GHZ-29.8 GHZ. As shown in FIG. 12, the maximum range of phase modulation in the frequency band of 28.8 GHz to 29.8 GHz can be about 360 degrees.

In some embodiments, along the first direction x and the second direction y, a length of the first strip-shaped groove 311 and a length of the second strip-shaped groove 411 in one resonant unit of two resonant units 101 that are adjacent to each other are a first length, and a length of the first strip-shaped groove 311 and a length of the second strip-shaped groove 411 in the other resonant unit 101 of the two resonant units are a second length, and the first length is greater than the second length, which can make that that two resonant units 101 that are adjacent to each other in the first direction x and in the second direction y have different resonant frequencies.

Figure 13:
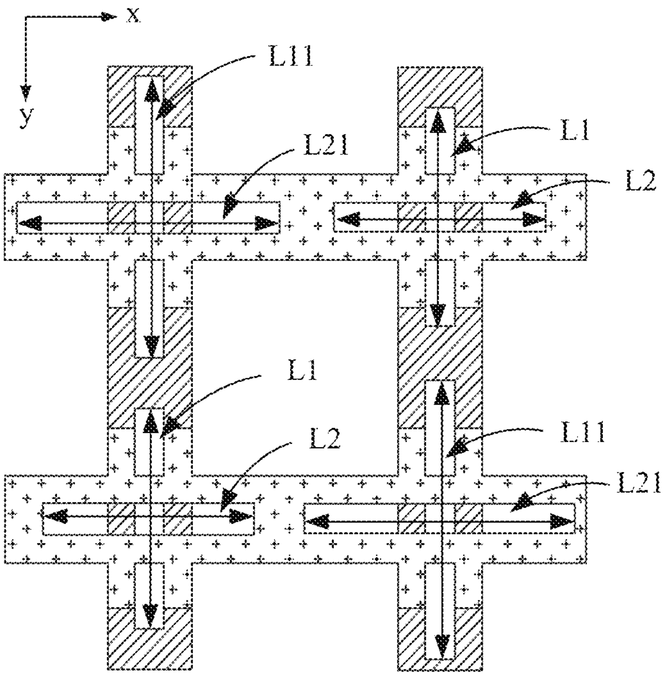
FIG. 13 shows a schematic structural diagram of another arrangement of resonant units in a phase-shifting layer provided by embodiments of the present disclosure.

For example, as shown in FIG. 13, one phase-shifting layer 100 includes four resonant units 101, and in the row direction and the column direction, the length of the first strip-shaped groove 311 and the length of the second strip-shaped groove 411 in one of the two resonant units 101 are both greater than the length of the first strip-shaped groove 311 and the length of the second strip-shaped groove 411 in the other of the two resonant units 101. In this structure, the transmittance of the polarization in first direction x and the transmittance of the polarization in the second direction y are symmetrical, and it is easy to realize a dual-polarization design. The orientation of the liquid crystal molecules is deflected in the overlapping portion where the he first electrode pattern 31 overlaps with the second electrode pattern 41 by simultaneously applying a high voltage or a low voltage to all the second electrode patterns 41, so as to achieve frequency shift. With the aid of resonant frequency shift in the two phase-shifting layers 100, a phase-shifting amount of 360° can be realized.

In practice, in each of the four resonant units 101 of FIG. 13, the orthographic projection of the first electrode pattern 31 on the first substrate and the orthographic projection of the second electrode pattern 41 on the first substrate are orthogonal to each other, and the intersection point of the two is the center point of the orthographic projections of the first electrode pattern 31 and the second electrode pattern 41 on the first substrate. In the four resonant units 101, the lengths P1 of the first electrode patterns 31 are equal to each other, the lengths P2 of the second electrode patterns 41 are equal to each other, the widths w1 of the first electrode patterns 31 are equal to each other, the widths w2 of the second electrode patterns 41 are equal to each other, the widths w3 of the first strip-shaped grooves 311 are equal to each other, the widths w4 of the second strip-shaped grooves 411 are equal to each other, the lengths w5 of the first comb teeth 312 are equal to each other, and the lengths w6 of the second comb teeth are equal to each other. It can be set that P1=P2=1.6 mm, w1=w2=0.56 mm, w3=w4=0.22 mm, and w5=w6=0.04 mm. While in the row direction and the column direction, the lengths L1 of the first strip-shaped grooves 311 in the two resonant units 101 are different from each other, and the lengths L2 of the second strip-shaped grooves 411 in the two resonant units 101 are different from each other. In one of the two resonant units 101, L1=L2=1.4 mm, and in the other of the two resonant units 101, the length L11 of the first strip-shaped groove 311 and the length L21 of the second strip-shaped groove may be L11=L21=1.44 mm. The thickness (d−2h) of the tunable dielectric layer 5 between the first electrode pattern 31 and the second electrode pattern 41 may be 20 micrometers, and the liquid crystal dielectric constants may be $\varepsilon\|$=3.58 (tan $\delta$=0.006), $\varepsilon\perp$=2.45 (tan $\delta$=0.011). The structure in FIG. 13 is used to perform phase modulation on space millimeter waves in the frequency band of 27 GHz with a vacuum wavelength of about 11.1 mm. When the liquid crystal molecules are oriented perpendicular to the first substrate, the transmittance of the liquid crystal molecules is shown as the solid line curve in FIG. 14, in which two transmittance peaks is at 26.5 GHZ and 28.3 GHZ.

Figure 14:
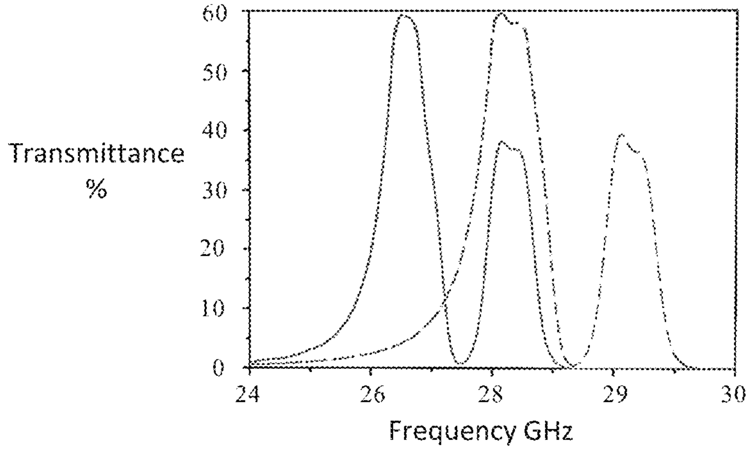
FIG. 14 shows a graph of a relationship between frequency and transmittance provided by embodiments of the present disclosure.
Figure 15:
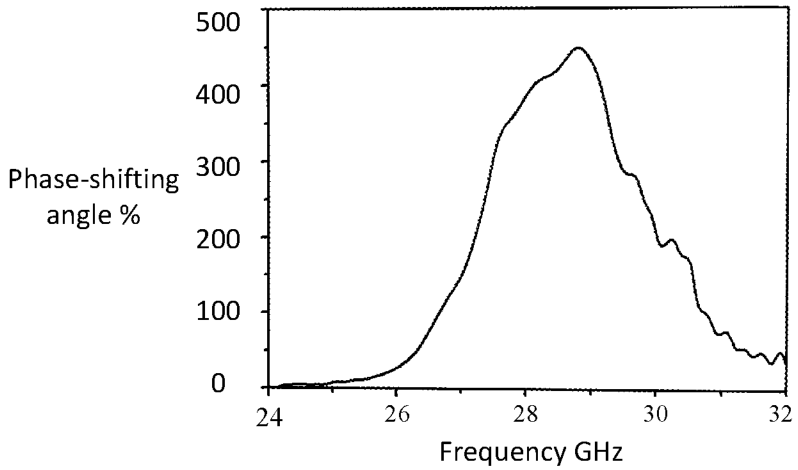
FIG. 15 shows a graph of a relationship between frequency and phase-shifting angle provided by embodiments of the present disclosure.

When the liquid crystal molecules are oriented parallel to the first substrate, the transmittance peaks of the liquid crystal molecules are shown as the dotted line curve in FIG. 14, and the transmittance peaks originally at 26.5 GHz and 28.3 GHz are shifted to 28.3 GHZ and 31.2 GHz. Alternatively, the spatial incidence electromagnetic wave frequency is from 28.1 GHz to 28.5 GHz, and then by the phase modulation through the resonant structure in FIG. 13, the maximum phase-shifting amount in this frequency band can be shown in FIG. 15, from which it can be seen that the maximum phase shift of nearly 400 degrees can be achieved in the frequency band around 28.3 GHZ.

In some embodiments, at least along the first direction x, a length of the first comb tooth 312 and a length of the second comb tooth in one resonant unit of two resonant units 101 that are adjacent to each other are a third length, and a length of the first comb tooth 312 and a length of the second comb tooth in the other resonant unit 101 of the two resonant units are a fourth length, and the fourth length is greater than the third length, which can make that two resonant units 101 that are adjacent to each other in the first direction x have different resonant frequencies.

Figure 16:
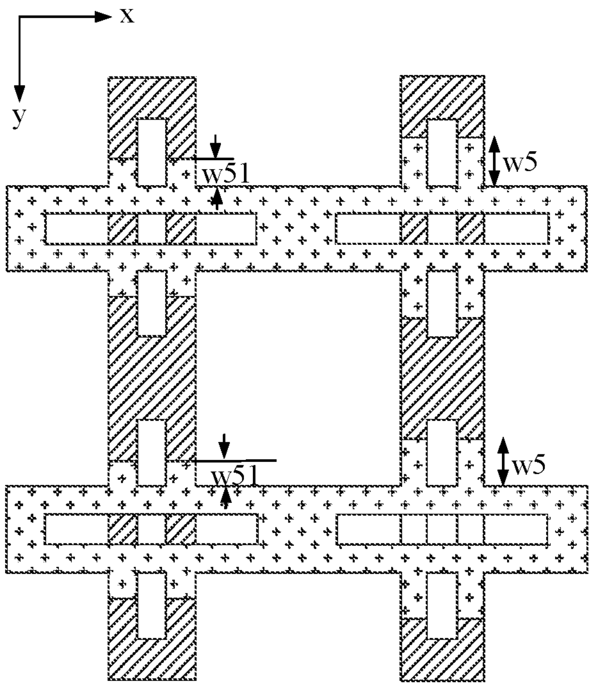
FIG. 16 shows a schematic structural diagram of another arrangement of resonant units in a phase-shifting layer provided by embodiments of the present disclosure.

For example, as shown in FIG. 16, one phase-shifting layer 100 includes four resonant units 101, and in the row direction, the length of the first comb tooth 312 and the length of the second comb tooth in one of the two resonant units 101 are both greater than the length of the first comb tooth 312 and the length of the second comb tooth of the other of the two resonant units 101. While in the column direction, the length of the first comb tooth 312 in one of the two resonant units 101 is equal to the length of the first comb tooth in the other of the two resonant units 101, and the length of the second comb tooth in one of the two resonant units 101 is equal to the length of the second comb tooth in the other of the two resonant units 101.

Figure 17:
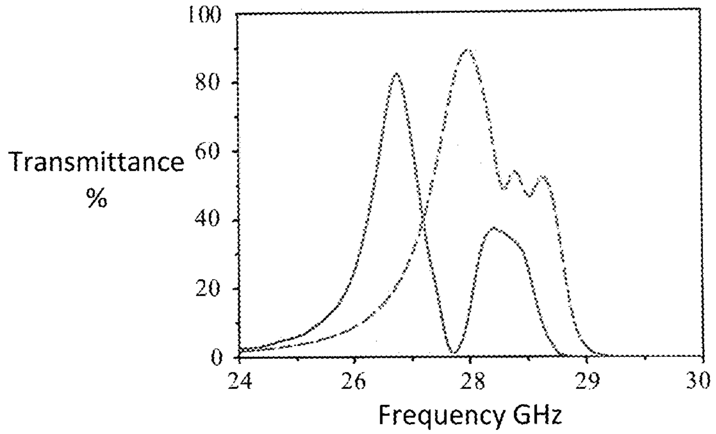
FIG. 17 shows a graph of a relationship between frequency and transmittance provided by embodiments of the present disclosure.
Figure 18:
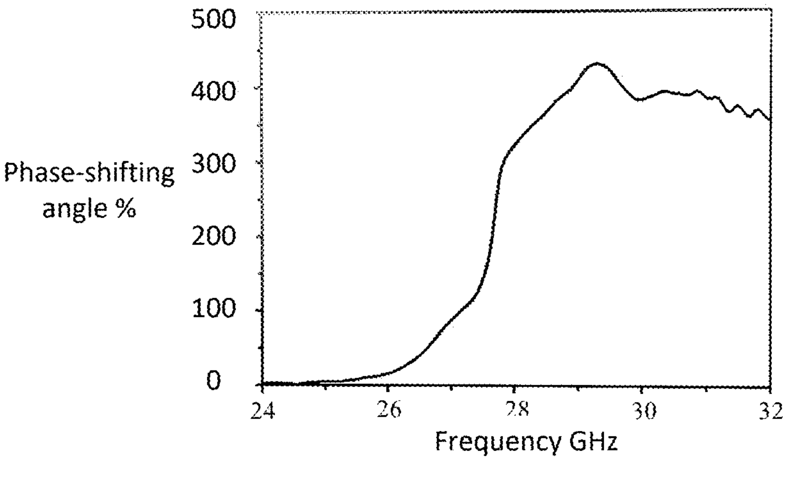
FIG. 18 shows a graph of a relationship between frequency and phase-shifting angle provided by embodiments of the present disclosure.

In practice, in each of the four resonant units 101 in FIG. 16, the orthographic projection of the first electrode pattern 31 on the first substrate and the orthographic projection of the second electrode pattern 41 on the first substrate are orthogonal to each other, and the intersection point of the two is the center point of the orthographic projections of the first electrode pattern 31 and the second electrode pattern 41 on the first substrate. In the four resonant units 101, the lengths P1 of the first electrode patterns 31 are equal to each other, the lengths P2 of the second electrode patterns 41 are equal to each other, the widths w1 of the first electrode patterns 31 are equal to each other, the widths w2 of the second electrode patterns 41 are equal to each other, the lengths L1 of the first strip-shaped grooves 311 are equal to each other, the lengths L2 of the second strip-shaped grooves 411 are equal to each other, the widths w3 of the first strip-shaped grooves 311 are equal to each other, and the widths w4 of the second strip-shaped grooves 411 are equal to each other. It can be set that P1=P2=1.8 mm, w1=w2=0.56 mm, L1=L2=1.44 mm, and w3=w4=0.20 mm. While in the row direction, the lengths of the first comb teeth 312 in the two resonant units 101 are different from each other, and the lengths of the second comb teeth in the two resonant units 101 are different from each other. In one of the two resonant units 101, w5=w6=0.05 mm, and in the other of the two resonant units 101, the length w5 of the first comb tooth 312 and the length w51 of the second strip-shaped groove may be w5=w51=0.02 mm. The thickness (d−2h) of the tunable dielectric layer 5 between the first electrode pattern 31 and the second electrode pattern 41 may be 20 μm, and the liquid crystal dielectric constants may be 1 may be 20 t electrode ⊥=2.45 (tan δ=0.011). It is assumed that the liquid crystal molecules are oriented along the direction perpendicular to the plane where the electrode patterns are located when a high voltage is applied to the second electrode patterns 41, and the liquid crystal molecules are oriented along the first direction x parallel to the plane where the electrode patterns are located when a low voltage is applied the second electrode patterns 41. If a high voltage is applied simultaneously on the two columns of resonant units, a dual-resonant transmittance curve formed by which is shown as the solid line curve in FIG. 17. If a high voltage is applied to the first column of resonant units and a low voltage is applied to the second column of resonant units, a dual-resonant transmittance curve formed by which is shown as the dotted line curve in FIG. 17. In FIG. 18, it can be seen that the maximum phase shift of 360 degrees can be formed at the transmittance peak at the higher frequency (28.5 GHZ).

In some embodiments, along the first direction x and the second direction y, a length of the first comb tooth 312 and a length of the second comb tooth in one of two resonant units 101 that are adjacent to each other are a third length, a length of the first comb tooth 312 and a length of the second comb tooth in the other of the two resonant units 101 are a fourth length, and the fourth length is greater than the third length, which can make that that two resonant units 101 that are adjacent to each other in the first direction x and in the second direction y have different resonant frequencies.

Figure 19:
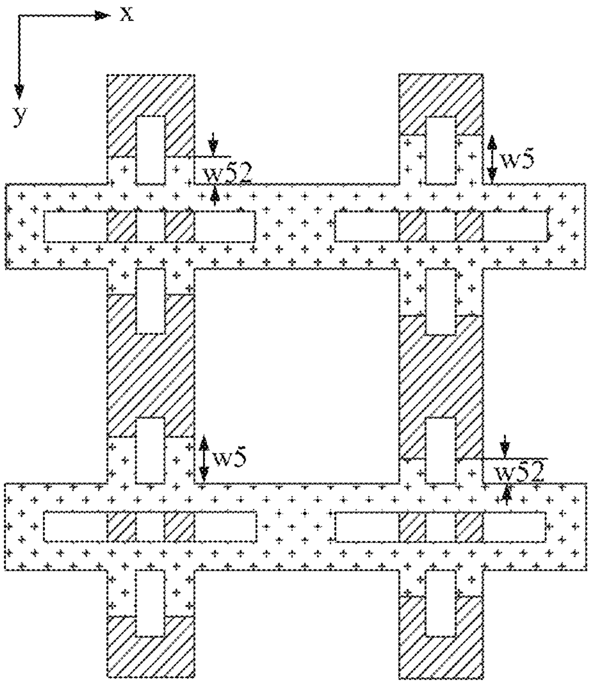
FIG. 19 shows a schematic structural diagram of another arrangement of resonant units in a phase-shifting layer provided by embodiments of the present disclosure.

For example, as shown in FIG. 19, one phase-shifting layer 100 includes four resonant units 101, and in the row direction and the column direction, the length of the first comb tooth 312 and the length of the second comb tooth in one of the two resonant units 101 are both greater than the length of the first comb tooth 312 and the length of the second comb tooth of the other of the two resonant units 101.

Figure 20:
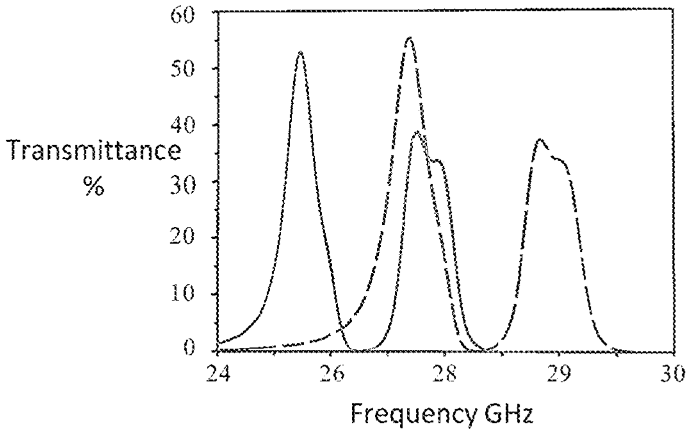
FIG. 20 shows a graph of a relationship between frequency and transmittance provided by embodiments of the present disclosure.
Figure 21:
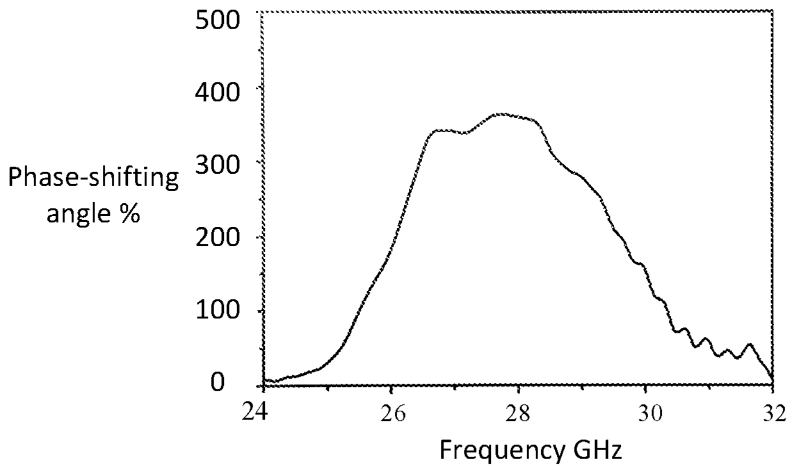
FIG. 21 is a graph of a relationship between a frequency and a phase-shifting angle provided by embodiments of the present disclosure.

In practice, in each of the four resonant units 101 in FIG. 19, the orthographic projection of the first electrode pattern 31 on the first substrate and the orthographic projection of the second electrode pattern 41 on the first substrate are orthogonal to each other, and the intersection point of the two is the center point of the orthographic projections of the first electrode pattern 31 and the second electrode pattern 41 on the first substrate. In the four resonant units 101, the lengths P1 of the first electrode patterns 31 are equal to each other, the lengths P2 of the second electrode patterns 41 are equal to each other, the widths w1 of the first electrode patterns 31 are equal to each other, the widths w2 of the second electrode patterns 41 are equal to each other, the lengths L1 of the first strip-shaped grooves 311 are equal to each other, the lengths L2 of the second strip-shaped grooves 411 are equal to each other, the widths w3 of the first strip-shaped grooves 311 are equal to each other, and the widths w4 of the second strip-shaped grooves 411 are equal to each other. It can be set that P1=P2=1.8 mm, w1=w2=0.56 mm, L1=L2=1.44 mm, and w3=w4=0.20 mm. While in the row direction and the column direction, the lengths of the first comb teeth 312 in the two resonant units 101 are different from each other, and the lengths of the second comb teeth in the two resonant units 101 are different from each other. In one of the two resonant units 101, w5=w6=0.05 mm, and in the other of the two resonant units 101, the length w5 of the first comb tooth 312 and the length w52 of the second strip-shaped groove may be w5=w52=0.02 mm. The thickness (d−2h) of the tunable dielectric layer 5 between the first electrode pattern 31 and the second electrode pattern 41 may be 20 μm, and the liquid crystal dielectric constants may be ε|=3.58 (tan n=0.006), ⊥=2.45 (tan δ=0.011). It is assumed that the liquid crystal molecules are oriented along the direction perpendicular to the plane where the electrode patterns are located when a high voltage is applied to the second electrode patterns 41, and the liquid crystal molecules are oriented along the first direction x parallel to the plane where the electrode patterns are located when a low voltage is applied the second electrode patterns 41. If a high voltage or a low voltage is applied simultaneously on the two columns of resonant units, dual-resonant transmittance curves formed by which are shown as the solid line curve and the dotted line curve in FIG. 20, respectively. In FIG. 21, it can be seen that a phase shift of up to 400 degrees can be formed at the transmittance peak at the higher frequency (28 GHz).

In the above embodiment of the present disclosure, when the resonant units 101 are distributed in an array, it can be set that, along the first direction x, the first electrode patterns 31 in two resonant units 101 that are adjacent to each other are connected with each other; and along the second direction y, the second electrode patterns 41 in the two resonant units 101 that are adjacent to each other are connected with each other, so that the structure is simple and easy to be fabricated.

Figure 22:
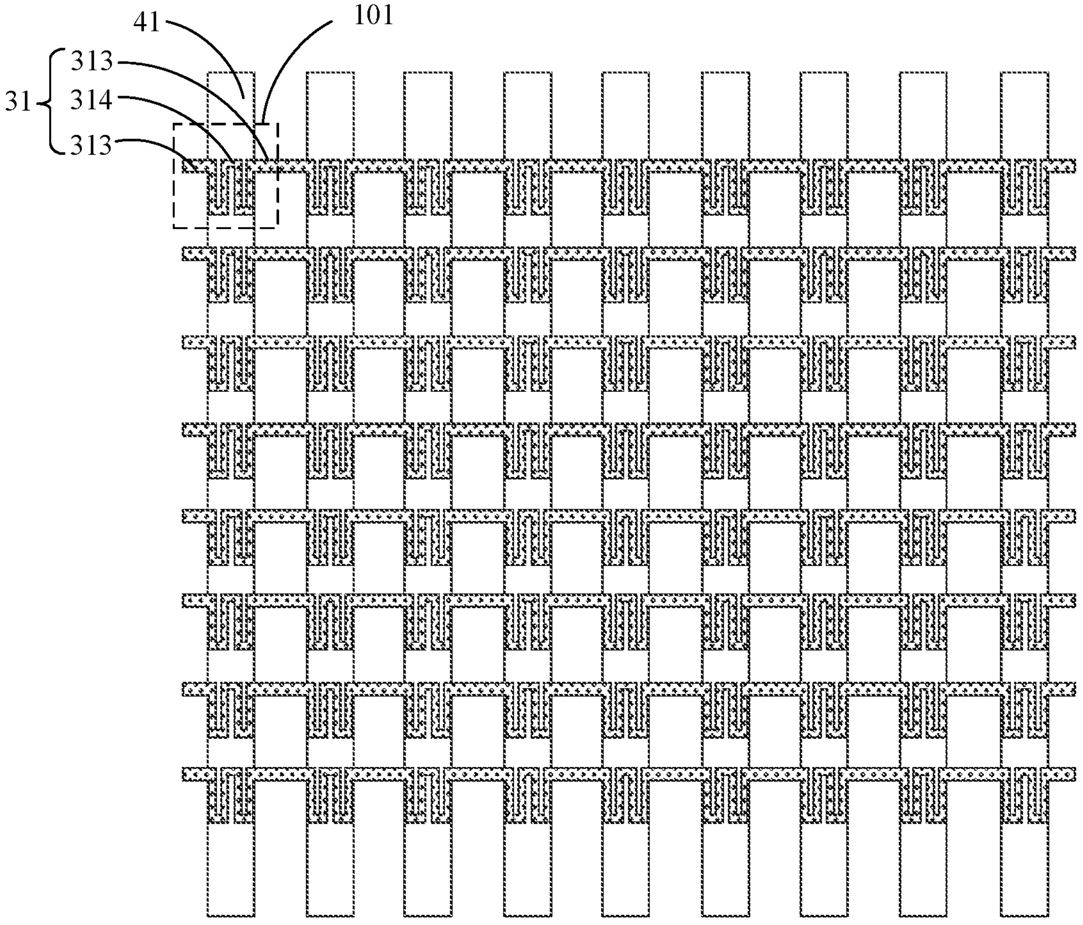
FIG. 22 shows a schematic structural diagram of resonant unit distributed in an array provided by embodiments of the present disclosure.

In the embodiment of the present disclosure, in order to reduce the size of the resonant units 101, as in FIG. 22, the first electrode pattern 31 may also be provided to include two straight line portions 313 extending along the first direction x and a microstrip line portion 314 connected between the two straight line portions 313; and the orthographic projection of the second electrode pattern 41 on the first substrate 1 covers an orthographic projection of the microstrip line portion 314 on the first substrate 1. The microstrip line portion 314 can increase the area of the overlapping region where the first electrode pattern 31 overlaps the second electrode pattern 41, and can reduce the size of the resonant unit 101.

In some embodiments, the above microstrip line portion 314 can be in the form of a folded line, as shown in FIG. 22.

In some embodiments, the above microstrip line portion 314 includes at least two square-wave shaped folded line portions, which is capable of realizing a dual-resonant structure of the resonant unit 101, and is capable of increasing the phase modulation range of the phase modulation surface unit.

In the embodiment of the present disclosure, the first substrate 1 and the second substrate 2 that are adjacent to each other and are respectively in two stacked phase-shifting layers that are adjacent to each other may be the same one substrate, which is simple in structure and easy to be fabricated, as shown in FIG. 1.

In the embodiment of the present disclosure, the at least two phase-shifting layers 100 may have the same structure, and orthographic projections of the first electrode patterns 31 in different first phase-shifting surface layers 3 on one first substrate 1 completely overlap with each other, and orthographic projections of the second electrode patterns 41 in different second phase-shifting surface layers 4 on one first substrate 1 completely overlap with each other, which is capable of realizing the two-layer phase modulation structure.

The present disclosure also provides a phase modulation surface structure including at least one at least one phase modulation surface unit distributed in an array of any one of the phase modulation surface units provided by the above technical solution.

Figure 23:
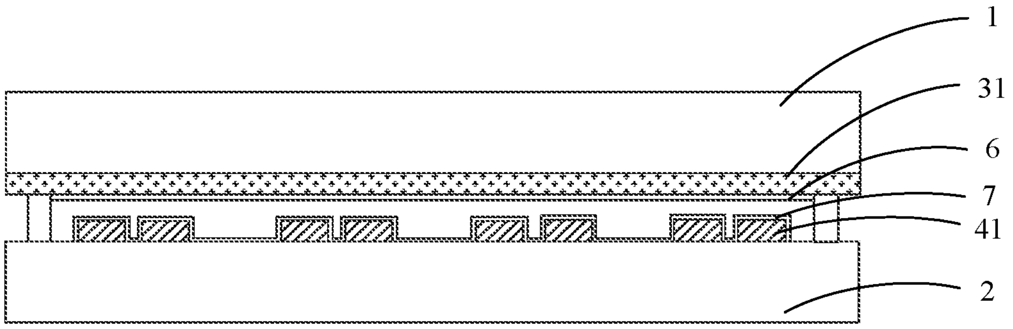
FIG. 23 shows a schematic structural diagram of a phase-shifting layer provided by embodiments of the present disclosure.

The plurality of phase modulation surface units of the above phase modulation surface structure includes at least two phase-shifting layers 100. A cross-sectional view of one of the phase-shifting layers 100 is as shown in FIG. 23. the first electrode patterns 31 along the first direction x are mutually connected with form a first metal wire grating pattern, the second electrode patterns 41 along the second direction y are mutually connected with form a second metal wire grating pattern, and the tunable dielectric layer 5 is located between the first metal wire grating pattern and the second metal wire grating pattern. The phase modulation function of the phase modulation surface structure can be realized by applying a deflection voltage to the tunable dielectric layer 5, as shown in FIG. 22. The phase modulation surface structure has at least two layers of resonant structures, is capable of generating a phase-shiftable range from 0 degrees to 180 degrees or greater. In addition, there is no need to set up additional control devices on each resonant unit 101, and the fabrication process and the structure are simple, which can save the fabrication cost.

The present disclosure also provides a terminal device, including the phase modulation surface structure provided by the above technical solution and a control board for controlling voltages applied to the first electrode pattern(s) 31 and the second electrode pattern(s) 41.

Obviously, a person skilled in the art may make various modifications and variations to the embodiments of the present disclosure without departing from the spirit and scope of the present disclosure. Thus, if these modifications and variations of the present disclosure fall within the scope of the claims of the present disclosure and their technical equivalents, the present disclosure is intended to encompass these modifications and variations as well.

What is claimed is:

1. A phase modulation surface unit, comprising at least two phase-shifting layers that are stacked, wherein each of the at least two phase-shifting layers comprises:

a first substrate;

a second substrate opposite to the first substrate;

a first phase-shifting surface layer on a side of the first substrate facing the second substrate, wherein the first phase-shifting surface layer comprises at least one first electrode pattern extending in a first direction and a first control line connected with the first electrode pattern;

a second phase-shifting surface layer on a side of the second substrate facing the first substrate; wherein the second phase-shifting surface layer comprises: at least one second electrode pattern extending in a second direction and corresponding one-to-one with the at least one first electrode pattern; and a second control line connected with the second electrode pattern; wherein an orthographic projection of the second electrode pattern on the first substrate intersects with an orthographic projection of the first electrode pattern, corresponding to the second electrode, on the first substrate; and the second electrode pattern and the first electrode pattern corresponding to the second electrode pattern forms one resonant unit; and a tunable dielectric layer, wherein the tunable dielectric layer is between the first phase-shifting surface layer and the second phase-shifting surface layer.

2. The phase modulation surface unit according to claim 1, wherein in one resonant unit, the orthographic projection of the first electrode pattern on the first substrate and the orthographic projection of the second electrode pattern on the first substrate are mutually orthogonal.

3. The phase modulation surface unit according to claim 1, wherein a length of the first electrode pattern is the same as a length of the second electrode pattern, a width of the first electrode pattern is the same as a width of the second electrode pattern, and a thickness of the first electrode pattern is the same as a thickness of the second electrode pattern.

4. The phase modulation surface unit according to claim 2, wherein a center point of the orthographic projection of the first electrode pattern on the first substrate coincides with a center point of the orthographic projection of the second electrode pattern on the first substrate.

5. The phase modulation surface unit according to claim 1, wherein in a middle region of the first electrode pattern, the first electrode pattern has a first strip-shaped groove extending in the first direction;

in a middle region of the second electrode pattern, the second electrode pattern has a second strip-shaped groove extending in the second direction; and an orthographic projection of the second strip-shaped groove on the first substrate intersects with an orthographic projection of the first strip-shaped groove on the first substrate.

6. The phase modulation surface unit according to claim 5, wherein a length of the first strip-shaped groove is the same as a length of the second strip-shaped groove, and a width of the first strip-shaped groove is the same as a width of the second strip-shaped groove.

7. The phase modulation surface unit according to claim 5, wherein the first electrode pattern has two first comb teeth extending in the second direction on each of two sides of the first electrode pattern arranged in the second direction, and a distance between the two first comb teeth is equal to a width of the second strip-shaped groove along the first direction;

the second electrode pattern has two second comb teeth extending in the first direction on each of two sides of the second electrode pattern arranged in the first direction, and a distance between the two second comb teeth is equal to a width of the first strip-shaped groove along the second direction; and the orthographic projection of the second electrode pattern on the first substrate covers an orthographic projection of the first comb teeth on the first substrate, and the orthographic projection of the first electrode pattern on the first substrate covers an orthographic projection of the second comb teeth on the first substrate.

8. The phase modulation surface unit according to claim 7, wherein a length of the first comb teeth along the second direction is the same as a length of the second comb teeth along the first direction, and a width of the first comb teeth along the first direction is the same as a width of the second comb teeth along the second direction; or wherein a width of the first comb teeth along the first direction is the same as a width between an inner wall of the second electrode pattern and an outer wall of the second electrode pattern along the second direction, and a width of the second comb teeth along the second direction is the same as a width between an inner wall of the first electrode pattern and an outer wall of the first electrode pattern along the first direction.

9. The phase modulation surface unit according to claim 5, wherein the first phase-shifting surface layer comprises a plurality of first electrode patterns distributed in an array, and the second phase-shifting surface layer comprises a plurality of second electrode patterns corresponding one-to-one with the plurality of first electrode patterns to form a plurality of the resonant units, a row direction of the plurality of resonant units arrangement is the first direction, and a column direction of the plurality of resonant units arrangement is the second direction;

the plurality of the resonant units along the first direction and/or the second direction have different resonant frequencies.

10. The phase modulation surface unit according to claim 9, wherein, along the first direction and/or the second direction, lengths of the first strip-shaped grooves in different resonant units are different and lengths of the second strip-shaped grooves in different resonant units are different; and/or, lengths of the first comb teeth in different the resonant units are different and lengths of the second comb teeth in different the resonant units are different.

11. The phase modulation surface unit according to claim 9, wherein the first phase-shifting surface layer comprises four first electrode patterns distributed in a 2×2 array, and the second phase-shifting surface layer comprises second electrode patterns corresponding one-to-one with the four first electrode patterns.

12. The phase modulation surface unit according to claim 10, wherein, at least along the first direction, a length of the first strip-shaped groove and a length of the second strip-shaped groove in one of two adjacent resonant units are a first length, and a length of the first strip-shaped groove and a length of the second strip-shaped groove in the other of the two adjacent resonant units are a second length, and the first length is greater than the second length.

13. The phase modulation surface unit according to claim 10, wherein, at least along the first direction, a length of the first comb tooth and a length of the second comb tooth in one of two adjacent resonant units are a third length, and a length of the first comb tooth and a length of the second comb tooth in the other of the two adjacent resonant units are a fourth length, and the fourth length is greater than the third length.

14. The phase modulation surface unit according to claim 1, wherein, along the first direction, first electrode patterns in two adjacent resonant units are connected with each other;

along the second direction, second electrode patterns in two adjacent resonant units are connected with each other.

15. The phase modulation surface unit according to claim 1, wherein the first electrode pattern comprises two straight line portions extending along the first direction and a microstrip line portion connected between the two straight line portions;

wherein the orthographic projection of the second electrode pattern on the first substrate covers an orthographic projection of the microstrip line portion on the first substrate.

16. The phase modulation surface unit according to claim 1, wherein the first substrate and the second substrate that are adjacent to each other and are respectively in the two stacked phase-shifting layers that are adjacent to each other are one substrate.

17. The phase modulation surface unit according to claim 1, wherein the at least two phase-shifting layers have a same structure, orthographic projections of first electrode patterns in different first phase-shifting surface layers on one first substrate completely overlap with each other, and orthographic projections of second electrode patterns in different second phase-shifting surface layers on one first substrate completely overlap with each other.

18. The phase modulation surface unit according to claim 1, wherein the tunable dielectric layer is a liquid crystal layer; and the phase modulation surface unit further comprises a first alignment layer and a second alignment layer, the first alignment layer is on a side of the first phase-shifting surface layer facing the tunable dielectric layer, and the second alignment layer is on a side of the second phase-shifting surface layer facing the tunable dielectric layer.

19. A phase modulation surface structure, comprising: at least one phase modulation surface unit arranged in an array according to claim 1.

20. A terminal device, comprising: the phase modulation surface structure according to claim 19 and a control board for controlling voltages applied to the first electrode pattern and the second electrode pattern.

* * * * *